United States Patent
Sasaki

Patent Number: 5,497,176
Date of Patent: Mar. 5, 1996

[54] METHOD OF TRANSFERRING DETAILED DATA BY TABLET DRIVER

[75] Inventor: Takeshi Sasaki, Saitama, Japan

[73] Assignee: Kabushiki Kaisha Wacom, Saitama, Japan

[21] Appl. No.: 290,629

[22] Filed: Aug. 1, 1994

Related U.S. Application Data

[63] Continuation of Ser. No. 917,631, Jul. 23, 1992, abandoned.

[30] Foreign Application Priority Data

Jul. 23, 1991 [JP] Japan .................................. 3-205729

[51] Int. Cl.⁶ ...................................................... G09G 5/00
[52] U.S. Cl. .............................. 345/173; 345/162; 178/18
[58] Field of Search ................................ 345/156, 157, 345/162, 173, 179, 180, 182, 185; 178/18, 19

[56] References Cited

U.S. PATENT DOCUMENTS

| | | | |
|---|---|---|---|
| 4,959,805 | 9/1990 | Ohouchi ................................ 178/18 |
| 5,031,119 | 7/1991 | Dulaney et al. ...................... 340/706 |
| 5,073,685 | 12/1991 | Kobayashi et al. ................. 340/706 |
| 5,121,442 | 7/1992 | Togawa et al. ..................... 340/709 |
| 5,162,783 | 11/1992 | Moreno ............................... 345/173 |
| 5,231,381 | 7/1993 | Duwaer ................................. 178/18 |

FOREIGN PATENT DOCUMENTS

| | | |
|---|---|---|
| 60-39282 | 1/1985 | Japan . |
| 60-194369 | 10/1985 | Japan . |
| 61-131031 | 6/1986 | Japan . |

*Primary Examiner*—Richard Hjerpe
*Assistant Examiner*—Lun-Yi Lao
*Attorney, Agent, or Firm*—Lowe, Price, LeBlanc & Becker

[57] ABSTRACT

When a tablet driver is used, an application program is capable of utilizing detailed data transmitted from a tablet. The application program issues a request that the tablet driver transfer detailed data only when it requires the detailed data, this transfer being performed without increasing ordinary system load.

7 Claims, 1 Drawing Sheet

METHOD OF TRANSFERRING DETAILED DATA BY TABLET DRIVER

This application is a continuation of application Ser. No. 07/917,631 filed Jul. 23, 1992, now abandonment.

BACKGROUND OF THE INVENTION

1. Field of the Invention

The present invention relates to a method of transferring detailed data by a tablet driver. More particularly, it pertains to a detailed data transferring method by which, when an application program requires data which are of greater meticulous exactness than data usually passed from the tablet driver, a request that the tablet driver transfer detailed data is issued. In response to this request, the tablet driver retrieves the detailed data which are transmitted from a tablet and stored in a buffer inside the tablet driver. The detailed data are then transferred to the application program.

2. Description of the Related Art

Conventional tablet drivers transfer detailed data to application programs, at any time, even when application programs do not require very much of the detailed data. Useless data are thus transferred, and therefore computer resources are exhausted for processing the useless data, thus decreasing the efficiency of entire systems. There are also many types of tablet drivers in capable of transferring detailed data, even when application programs require detailed data so that the efficiency of systems can not decrease.

SUMMARY OF THE INVENTION

The object of the present invention is therefore to provide a detailed data transferring method by which an application program is capable of utilizing detailed data through a tablet driver, and by which unnecessary data are not transmitted when the application program requires no detailed data. A system load is thereby reduced to a minimum.

A buffer is provided inside the tablet driver, which buffer is used for storing data transmitted from a tablet. The tablet driver first stores sequentially the data in the buffer, eliminates unnecessary data, and then transfers only those data required by the application program to this program. When detailed data are required, the application program issues a request that the tablet driver transfer the detailed data. When the request is issued, keys for retrieving two data items transmitted from the tablet driver are passed to the application program. A coordinate value, information indicating whether the switch of a coordinate indicating device is turned on or off, a time stamp, etc. may be used as the retrieving keys. The tablet driver retrieves the two data items in the buffer with the aid of the retrieving keys. When the two data items are found, the application program is informed of detailed data between the two data items.

Unnecessary data are usually eliminated, and only the minimum amount of necessary data are transferred to the application program, thus reducing the system load. When detailed data are required, a request that the tablet driver transfer the detailed data is issued, thereby making it possible for the application program to utilize the detailed data.

DESCRIPTION OF THE PREFERRED EMBODIMENT

Figure 1:
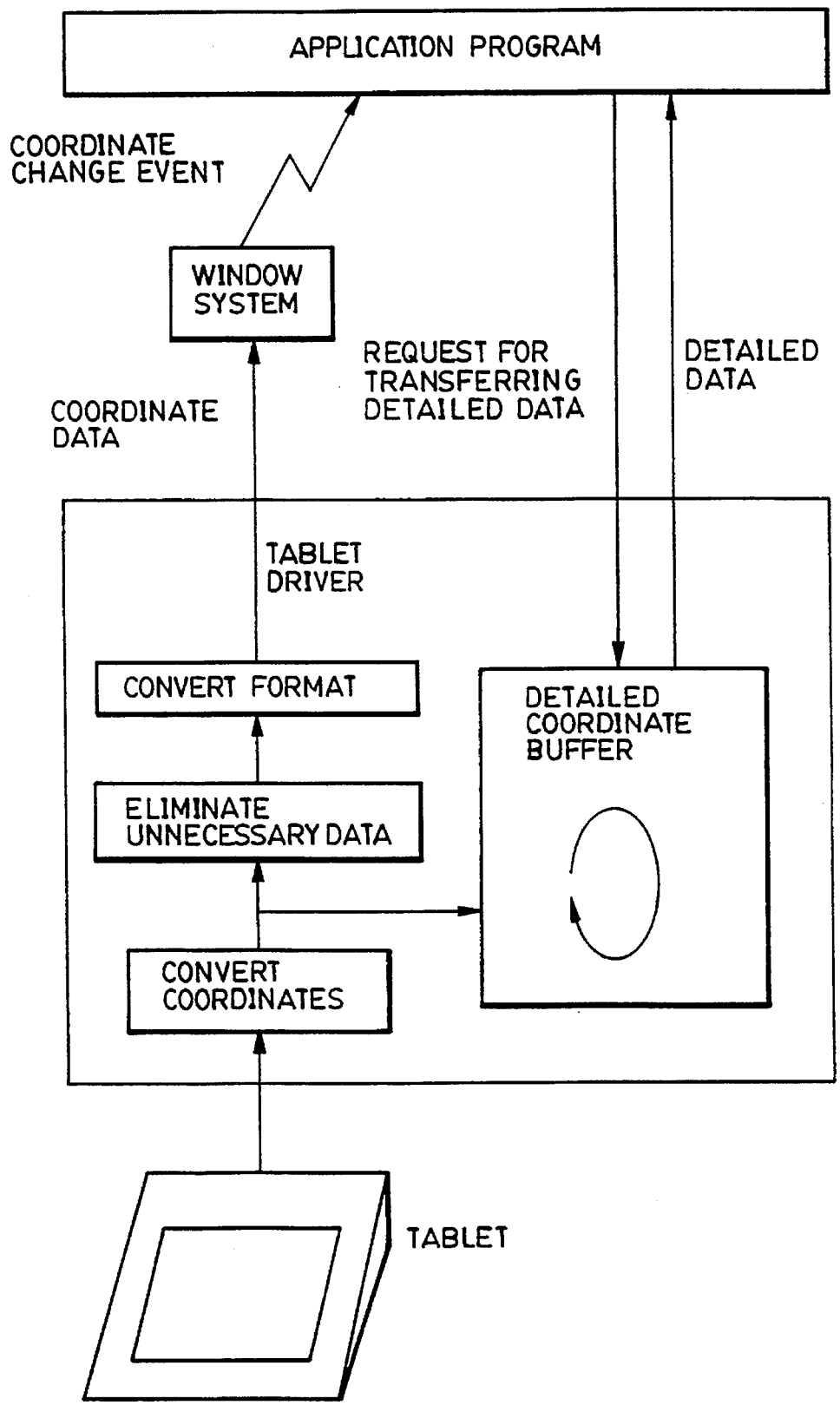
FIG. 1 is a schematic diagram of a method of transferring detailed data in accordance with a preferred embodiment of the invention.

A method of transferring detailed data is used when a mouse emulation tablet driver of a window system is created. The tablet driver converts coordinate data transmitted from a tablet and then stores them in a buffer used for storing detailed data. The coordinate data have a high sampling rate and include information regarding pressure applied by a pen to a coordinate indicating device and other information. The coordinate data which have a sampling rate as high as approximately 200 points per second are eliminated so that the remaining data have a sampling rate as low as approximately 20 to 40 points per second. Only the coordinate data and information regarding the switch of the coordinate indicating device are transmitted to the window system. Upon receiving the coordinate data from the tablet driver, the window system moves a pointer on the screen to inform the application program of events indicating coordinate changes. When the application program has been informed of the events and requires detailed data, it issues a request that the tablet driver transfer the detailed data by using two coordinate values contained in the above two events as the retrieving keys. The tablet driver uses the two coordinate values as the retrieving keys and then searches the buffer for two data items which agree with the two coordinate values. All detailed data between the two data items are transferred to the application program. The detailed data have a high sampling rate and include information regarding pressure applied by the pen to the coordinate indicating device and other information.

By employing the detailed data transferring method described above, unnecessary data are not usually transferred to the application program, thereby reducing the system load. In addition, the application program is capable of issuing a request that the tablet driver transfer detailed data when required so that the detailed data can be utilized.

Thus, coordinate data having a high sampling rate and information regarding the height, tilt, and rotational angle of the coordinate indicating device and pressure applied by the pen to this indicating device may also be transferred to the application program and utilized.

The application program of this invention may be compatible with an application program used for a mouse. In other words, the contents of non-detailed data usually transferred to the application program of this invention are made the same as those of data used for the mouse. Thereby many application programs used for a mouse can be directly used with the tablet. Also, it is possible to create an application program which is compatible with another application program used for a mouse and which makes full use of the function of the tablet when detailed data are required.

What is claimed is:

1. A method of transferring detailed data from a tablet to an application program via a tablet driver, the tablet driver including a buffer for storing detailed data derived from the tablet, the method comprising sequentially storing the tablet data in the buffer, supplying a request for detailed data from the application program to the tablet driver when the application program requires the detailed data, supplying the detailed data to the application program from the buffer in response to the request, otherwise eliminating some data points of the coordinate data having the high sampling rate to provide remaining data having a reduced sampling rate, and supplying only the remaining data having the reduced sampling rate to a window system.

2. The method of claim 1 wherein the detailed data include at least one of (a) pressure applied by an implement to the tablet and (b)(i) height, (ii) tilt, and (iii) rotational angle of a coordinate indicating device of the tablet; the data of a type usually passed from the tablet to the application program including the location of the implement on the tablet.

3. The method of claim 2 wherein the detailed data supplied to the application program have a high sampling rate and the data of a type usually passed from the tablet to the application program have a low sampling rate.

4. The method of claim 1 wherein the detailed data supplied to the application program have a high sampling rate and the data of a type usually passed from the tablet to the application program have a low sampling rate.

5. A method of transferring detailed data from a tablet to an application program via a tablet driver such that data derived from the tablet which are not needed by the application program are not coupled to the application program by the tablet driver, the method being used when a mouse emulation tablet driver of a window system is created, the method comprising:

storing coordinate data derived from the tablet in a buffer of the tablet driver, the coordinate data having a high sampling rate, eliminating some data points of the coordinate data having the high sampling rate to provide remaining data having a reduced sampling rate, supplying only the remaining data having the reduced sampling rate to the window system, the window system moving a pointer on a display in response to the remaining data having the reduced sampling rate and informing the application program of coordinate changes of an implement relative to the tablet, and transferring the coordinate data having the high sampling rate from the buffer to the application program in response to the application program issuing a request to the tablet driver to transfer the coordinate data having the high sampling rate.

6. The method of claim 5 wherein the application program requests the transfer of coordinate data having the high sampling rate from the buffer to the application program by using two coordinate values of an implement on the tablet as retrieving keys.

7. The method of claim 6 wherein the tablet driver searches the buffer for two data values agreeing with the two coordinate values, and transferring from the tablet driver to the application program the high sampling rate data located between the two coordinate values in the buffer.

* * * * *